(12) United States Patent
Moulds

(10) Patent No.: US 11,232,934 B2
(45) Date of Patent: Jan. 25, 2022

(54) METHOD FOR MEASUREMENT OF ION EVENTS

(71) Applicant: MICROMASS UK LIMITED, Wilmslow (GB)

(72) Inventor: Richard Moulds, Wilmslow (GB)

(73) Assignee: MICROMASS UK LIMITED, Wilmslow (GB)

( * ) Notice: Subject to any disclaimer, the term of this patent is extended or adjusted under 35 U.S.C. 154(b) by 644 days.

(21) Appl. No.: 15/038,809

(22) PCT Filed: Nov. 25, 2014

(86) PCT No.: PCT/GB2014/053486
§ 371 (c)(1),
(2) Date: May 24, 2016

(87) PCT Pub. No.: WO2015/079218
PCT Pub. Date: Jun. 4, 2015

(65) Prior Publication Data
US 2016/0379812 A1 Dec. 29, 2016

(30) Foreign Application Priority Data

Nov. 27, 2013 (GB) ..................................... 1320908

(51) Int. Cl.
*H01J 49/00* (2006.01)
*G06K 9/00* (2006.01)
*H01J 49/02* (2006.01)

(52) U.S. Cl.
CPC ........ *H01J 49/0036* (2013.01); *G06K 9/0053* (2013.01); *G06K 9/00503* (2013.01); *H01J 49/025* (2013.01)

(58) Field of Classification Search
CPC .......... G01N 30/8624; G01N 30/8631; G01M 3/207; G01M 3/202; H01J 49/0036;
(Continued)

(56) References Cited

U.S. PATENT DOCUMENTS 8,302,454 B2 * 11/2012 Rolff ..................... G01M 3/202
73/1.06
2002/0182604 A1 * 12/2002 Excoffier ........... G01N 30/8624
435/6.12

(Continued)

FOREIGN PATENT DOCUMENTS

EP 2 422 353 B1 9/2013

OTHER PUBLICATIONS

M.Kim "A multi-threshold sampling method for TOF-PET signal processing", Jan. 2009.*
(Continued)

*Primary Examiner* — Andrew Schechter
*Assistant Examiner* — Kaleria Knox
(74) *Attorney, Agent, or Firm* — Kacvinsky Daisak Bluni PLLC

(57) ABSTRACT

A method of processing an input data stream including at least one data peak (2), comprising: detecting at least one peak (2) in the input data stream having an apex with an amplitude above a predetermined threshold (4); and extrapolating (30) the segment of the peak which has an amplitude above the predetermined threshold (7, 8), based on a shape characteristic of the peak (2), to estimate the amplitude of the segments of the peak which have an amplitude less than said threshold (15, 16).

18 Claims, 9 Drawing Sheets

(58) Field of Classification Search
CPC . H01J 49/025; G06K 9/0053; G06K 9/00503; G16C 20/20; G01T 7/005
USPC .......................................................... 702/32
See application file for complete search history.

(56) References Cited

U.S. PATENT DOCUMENTS

| | | |
|---|---|---|
| 2003/0173514 A1 | 9/2003 | Syage et al. |
| 2007/0179367 A1* | 8/2007 | Ruchti ................ A61B 5/1495 600/310 |
| 2009/0228245 A1 | 9/2009 | Gilbert et al. |
| 2010/0100336 A1* | 4/2010 | Wright .................. G16C 20/20 702/32 |
| 2012/0126110 A1 | 5/2012 | Green et al. |
| 2012/0158318 A1* | 6/2012 | Wright ................ H01J 49/0036 702/28 |
| 2012/0305756 A1* | 12/2012 | Russ ...................... G01T 7/005 250/252.1 |
| 2014/0149050 A1* | 5/2014 | Yanagisawa ....... G01N 30/8631 702/23 |

OTHER PUBLICATIONS

Stone "Application of median filtering to noisy data". (Year: 1995).*
Richard Moulds, et al., "Extending the Linear Dynamic Range of Quadruoile Detectors," Waters, ASMS 2014, Jun. 19, 2014.
H. Kim, "A multi threshold sampling method for TOF-PET signal processing," Nuclear Instruments and Methods in Physics Research A, 602, Apr. 21, 2009, 618-621.
Qingguo Xie, et al., "A New Approach for Pulse Processing in Positron Emission Tomography," IEEE Transactions on Nuclear Science, vol. 52, No. 4, Aug. 2005.
PCT/GB2014/053486, International Search Report dated Feb. 19, 2015.

* cited by examiner

METHOD FOR MEASUREMENT OF ION EVENTS

This application is a National Stage of International Application No. PCT/GB2014/053486, filed Nov. 25, 2014, which claims priority to GB 1320908.5, filed Nov. 27, 2013, which are incorporated by reference herein.

TECHNICAL FIELD

The present invention relates to a method for measurement of ion events. More specifically, the present invention relates to a method of processing a data stream, particularly to a method of measuring and extrapolating peaks in data obtained from a mass spectrometer. The present invention also relates to a mass spectrometer.

BACKGROUND

A known method of obtaining a mass spectrum comprises recording the output signal from an ion detector of a mass analyser, as a function of time, using a fast analogue-to-digital converter (ADC). It is known to use an ADC with a scanning magnetic sector mass analyser, a scanning quadrupole mass analyser or an ion trap mass analyser.

The ADC records the signal intensity (amplitude) at each clock cycle $T_n$. Known ADCs can digitise a signal at a rate, for example, of 40 MHz whilst recording the intensity of the signal as a digital value of 16 bits. In a TOF based system, a typical rate may be 2 GHz and the signal intensity may be recorded as a digital value of 8 bits.

An ADC produces a data stream comprising a continuum intensity profile as a function of time corresponding to the signal (current) output from the electron multiplier, as illustrated in FIG. 1.

An advantageous feature of an ADC system is that it can record multiple simultaneous ion arrival events by outputting an increased intensity value. Multiple ion arrival events can therefore be accurately recorded using an ADC.

ADCs suffer from the problem that any noise (e.g. electrical noise, spontaneous detector events caused by, for example, cosmic rays etc.) will also be digitised. There is a need to distinguish between background noise current and current due to ion impacts.

To reduce or compensate for the effects of noise, it is known to apply a threshold to an input data stream. With this thresholding method, whenever the amplitude of the measured data stream is below a predetermined threshold, that or those part(s) of the input data stream is/are ignored in subsequent processing of the input data stream, set to zero or otherwise flagged. Only the segment of the input data stream in which the amplitude is equal to or above the threshold will be of interest (and subsequently summed to produce a final mass spectrum or m/z chromatogram).

FIG. 1 illustrates the output of an ADC and depicts a single ion event. The input data stream 1 comprises a single (first) peak 2 having an apex 11 and also incorporates background noise 3 and spontaneous detector events 12 (false peaks). The mean (average) 9 of the baseline of the input data stream 1 is also indicated in FIG. 1. The baseline is the part of the data stream not including ion events (peaks) or spontaneous detector events, which is within the range of the background noise 3 illustrated in FIG. 1. The peak 2 has a leading edge 7 and a trailing edge 8, either side of the apex 11.

In accordance with a known technique, a threshold 4 is set at a predetermined level. The level of the threshold 4 is preferably high enough so as to ignore anticipated background noise 3 and spontaneous detector events 12, but low enough so as not inadvertently to ignore genuine ion peaks 2. Inevitably, using this technique, a segment 5 of the leading edge 7 and a segment 6 of the trailing edge 8 of a peak 2 will be below the predetermined threshold 4. A segment 10 will be above the threshold, comprising a part of the leading edge 7 and a part of the trailing edge 8.

Applying the known technique, any parts of the input data stream 1 having an amplitude (intensity) below the predetermined threshold 4 are ignored (or set to zero or a constant or flagged). The mean of the baseline 9 of the input data stream 1 may also be subtracted from the input data stream 1. The resultant filtered data stream 20 is depicted in FIG. 2, including only the segment 10 of the peak 2 in the input data stream 1 which is above the predetermined threshold 4.

By ignoring some of the peak data, the threshold technique inevitably leads to inaccuracies in subsequent centroid detection and calculation of the area under the peak 2. It will be noted that the area beneath segment 6 in FIG. 1 represents a significant part of the area under the peak 2 as a whole.

Where ion responses (peaks 2) are separated in time, and where the shape and apex amplitude of each peak 2 is substantially the same, these inherent inaccuracies may be substantially constant. The resulting error may be tolerated and/or reliably compensated for. For example, for every peak detected, a correction constant (or variable) may be applied to the data.

However, where an input data stream 1 includes multiple ion events 2 (peaks) which at least partially overlap, segments of a peak 2 which would have been under the threshold if the peak 2 was separate from other peaks 2 in the input data stream, will now be 'pushed' above the threshold, when combined with a segment of an adjacent, overlapping, peak 2. Accordingly, this part of the input data stream will be included in subsequent processing of the data.

This leads to a difference in the mean centroid and or peak area calculated for a given peak 2 depending on whether it is separated from all other peaks 2, or overlapping with at least one other peak (and the extent of the overlap).

It is common for a given input data stream to include both separated and overlapping peaks, and it is a requirement for such input data streams to be accurately processed and analysed. However, applying the known threshold techniques to such input data streams inherently causes inaccuracies, depending on whether the peaks are overlapping or separated.

Similar problems are encountered in time-of-flight (TOF) mass spectrometry, which can lead to inaccuracies in quantitation and peak centroiding.

An improved method is required.

SUMMARY OF THE INVENTION

Accordingly, the present invention provides a method of processing an input data stream including at least one data peak, comprising: detecting at least one peak in the input data stream having an apex with an amplitude above a predetermined threshold; and extrapolating the segment of the peak which has an amplitude above the predetermined threshold, based on a shape characteristic of the peak, to estimate the amplitude of the segments of the peak which have an amplitude less than said threshold.

Preferably, the step of detecting at least one peak comprises detecting at least one of the leading edge, apex or trailing edge of the peak.

Preferably, the method further comprises producing a filtered data stream, comprising applying a predetermined threshold to the input data stream, such that the filtered data stream contains only the segment of the peak above the predetermined threshold.

Preferably, if the amplitude of the input data stream at a time $T_n$ is less than said threshold, the amplitude in the filtered data stream at time $T_n$ is set to one of zero or a constant.

Preferably, the method further comprises: compiling a compensated data stream including the filtered data and extrapolated peak data.

Preferably, the method further comprises summing the estimated amplitude of extrapolated peak data and the filtered data stream over time.

Preferably, the method further comprises estimating a shape characteristic of the peak.

Preferably, the step of estimating a shape characteristic of the peak includes assessing the segment of the peak above the predetermined threshold.

Preferably, the step of extrapolating the peak comprises detecting the time, $T_T$, at which the amplitude of the trailing edge of the peak in the input data stream falls below the predetermined threshold; and estimating the amplitude of the peak at time $T_T$ by applying a decay function, based on the shape characteristic, to the amplitude of the data peak at time $T_{T-1}$, above the predetermined threshold.

Preferably, the method further comprises estimating the amplitude or the peak at time $T_n$ by applying a decay function, based on the shape characteristic of the peak, to the estimated amplitude of the peak at time $T_{n-1}$.

Preferably, the method further comprises iteratively applying the decay function for all values of n.

Preferably, the method further comprises repeating the step of iteratively applying a decay function until the amplitude of the input data stream at time $T_n$ is greater than or equal to the predetermined threshold, or the estimated amplitude at time $T_n$ is substantially equal to zero, the mean of the baseline, or a constant.

Preferably, the step of applying the decay function comprises multiplying the amplitude of the peak at time $T_{n-1}$ by a constant decay value between 0 and 1.

Preferably, the step of extrapolating the peak comprises detecting the time, $T_L$, at which the amplitude of the leading edge of the peak in the input data stream increases above the predetermined threshold; and applying a growth function, based on the shape characteristic, to the amplitude of the data peak at time $T_L$, to produce an estimated amplitude of the peak at time $T_{L-1}$.

Preferably, the method further comprises estimating the amplitude of the peak at time $T_{n-1}$ by applying a growth function, based on the shape characteristic of the peak, to the estimated amplitude of the peak at time $T_n$.

Preferably, the method further comprises iteratively applying the growth function for all values of n.

Preferably, the method further comprises repeating the step of iteratively applying a growth function until the amplitude of the input data stream at time $T_{n-1}$ is greater than or equal to the predetermined threshold; or the estimated amplitude at time $T_{n-1}$ is less than or substantially equal to zero, the mean of the baseline, or a constant.

Preferably, the growth function is linear.

Preferably, the amplitude at time $T_{n-1}$ is estimated by subtracting a predetermined constant from the estimated amplitude at time $T_n$.

Preferably, the growth function is based on the rate of change of at least part of the segment of the input data stream which is above the predetermined threshold.

Preferably, if the input data stream includes two or more peaks, and extrapolation of the respective peaks generates conflicting estimates for the amplitude at a time T, the highest of those estimates is selected for time T.

Preferably, the input data stream comprises a signal output from an ion detector.

Preferably, the input data stream comprises a voltage signal, ion signal, ion current voltage pulse or an electron current pulse.

Preferably, the input data stream comprises the output of an analogue to digital converter of an ion detector of a mass spectrometer.

Preferably, the method further comprises applying a smoothing function to the input data stream using a finite impulse response or infinite impulse response filter.

The present invention further provides a method of processing an input data stream including at least one data peak, comprising: extrapolating the segment of a peak which has an amplitude above the predetermined threshold, based on a shape characteristic of the peak, to estimate the amplitude of the segments of the peak which have an amplitude less than said predetermined threshold.

The present invention further provides a mass spectrometer comprising an ion source; an analyser; an ion detector producing a data stream; and a processor configured or programmed to: detect at least one peak in the data stream having an apex with an amplitude above a predetermined threshold; and extrapolate the segment of the peak which has an amplitude above the predetermined threshold, based on a shaped characteristic of the peak, to estimate the amplitude of the segments of the peak which have an amplitude less than said threshold.

The present invention further provides a computer program or programmable logic element comprising computer readable program code means or programmed logic for causing a processor to execute a procedure to implement the method of the present invention.

Preferably, the computer program element is embodied on a computer readable medium.

The present invention further provides a computer readable medium having a program stored thereon, wherein the program is to make a computer execute a procedure to implement the method of the present invention.

BRIEF DESCRIPTION OF DRAWINGS

Embodiments of the present invention will now be described, by way of example only, with reference to the Figures in which.

DESCRIPTION

Figure 1:
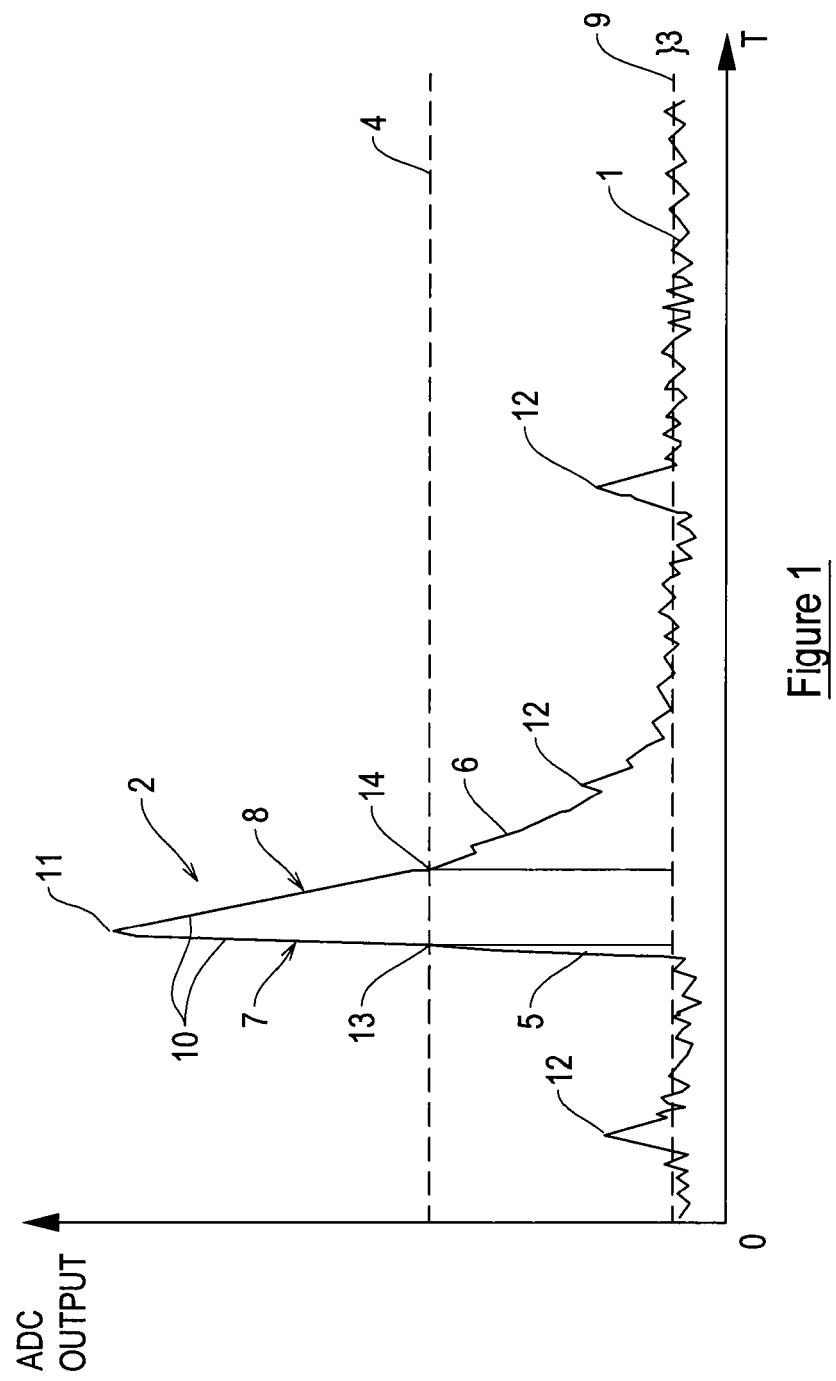
FIG. 1 illustrates an input data stream depicting a single ion response.

As discussed above, FIG. 1 illustrates an input data stream 1 which incorporates noise 3 and spontaneous detector events 12. The present invention provides a method comprising detecting at least one peak 2 in the input data stream 1. A peak 2 will be detected if it has an apex 11 with an amplitude above the predetermined threshold 4.

Figure 2:
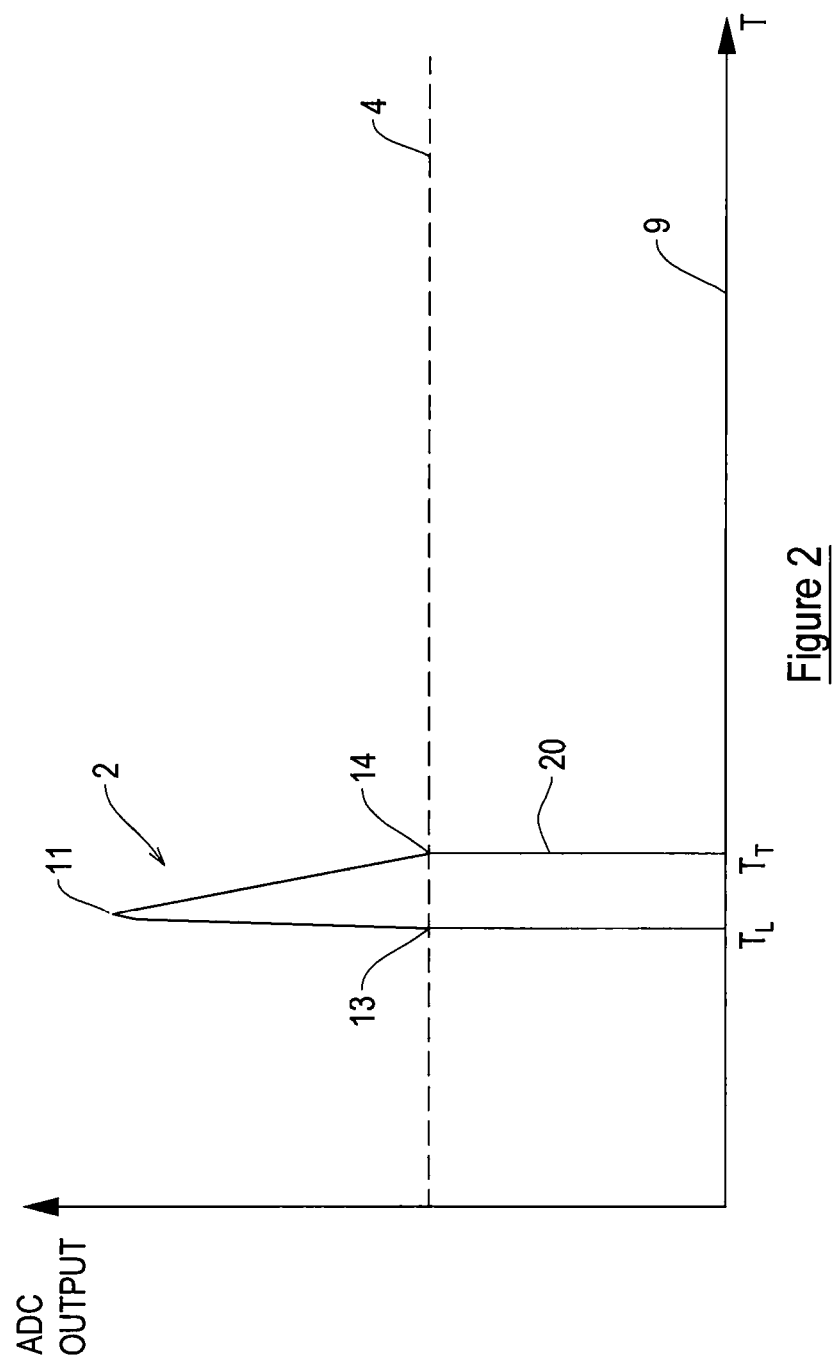
FIG. 2 illustrates a filtered data stream generated by applying a predetermined threshold to the input data stream of FIG. 1.

FIG. 2 illustrates a filtered data stream 20, which corresponds to the input data stream 1 of FIG. 1 having been filtered using the predetermined threshold 4. It will be noted that none of the noise 3 and spontaneous detector events 12 are included in the filtered data stream 20. In FIG. 2, the segments 5, 6 of the input data stream 1 in which the amplitude is below the predetermined threshold have been set to 0. Alternatively, those segments 5, 6 may be ignored entirely, or flagged.

With reference to FIGS. 1 and 2, the leading edge crossover point 13 is the point at which the leading edge 7 crosses the threshold 4 (i.e. the amplitude rises from below the threshold 4 to above the threshold 4). Likewise, the trailing edge crossover point 14 is the point at which the trailing edge 8 crosses the threshold 4 (i.e. the amplitude falls from above the threshold 4 to below the threshold 4).

A method embodying the present invention extrapolates the data peak 2 of the filtered data stream 20. More specifically, a method embodying the present invention extrapolates the segment of the peak 2 above the predetermined threshold 4. The data peak 2 is extrapolated based on a shape characteristic of the peak 2, to estimate the amplitude of the peak 2 when the amplitude of the input data stream 1 is less than the predetermined threshold 4. Extrapolation is performed on either side of the data peak 2; that is to say for both the leading edge 7 and trailing edge 8. It will be noted from FIG. 1 that the profile of the leading edge 7 of the data peak 2 is different to the profile of the trailing edge 8 of the data peak 2.

Ion detection systems generally incorporate avalanching devices to multiply the incoming single ions into enough electron current to be readily detectable by the system's electronic acquisition system. Existing detection systems include for example a photo-multiplier tube, a multi channel plate (MCP) or an electron-multiplier. The invention will be described with reference only to a PMT based system. The photo-multiplier tube is effectively a pulsed output current source, and so the wave shape at the ADC input consists of a very rapid rise to a peak value, which then decays substantially exponentially. For example, the output may rise from the mean level (or zero) to a peak value over just one ADC sample time unit; and may then decay to 90% of its previous value with each additional ADC sample time unit.

As a consequence, the profile of the leading edge 7 of the data peak 2 in FIG. 1 is substantially linear. The profile of the trailing edge 8 of the data peak 2 is substantially exponential. Methods of extrapolating both the leading edge 7 and trailing edge 8 will now be described.

Figure 3:
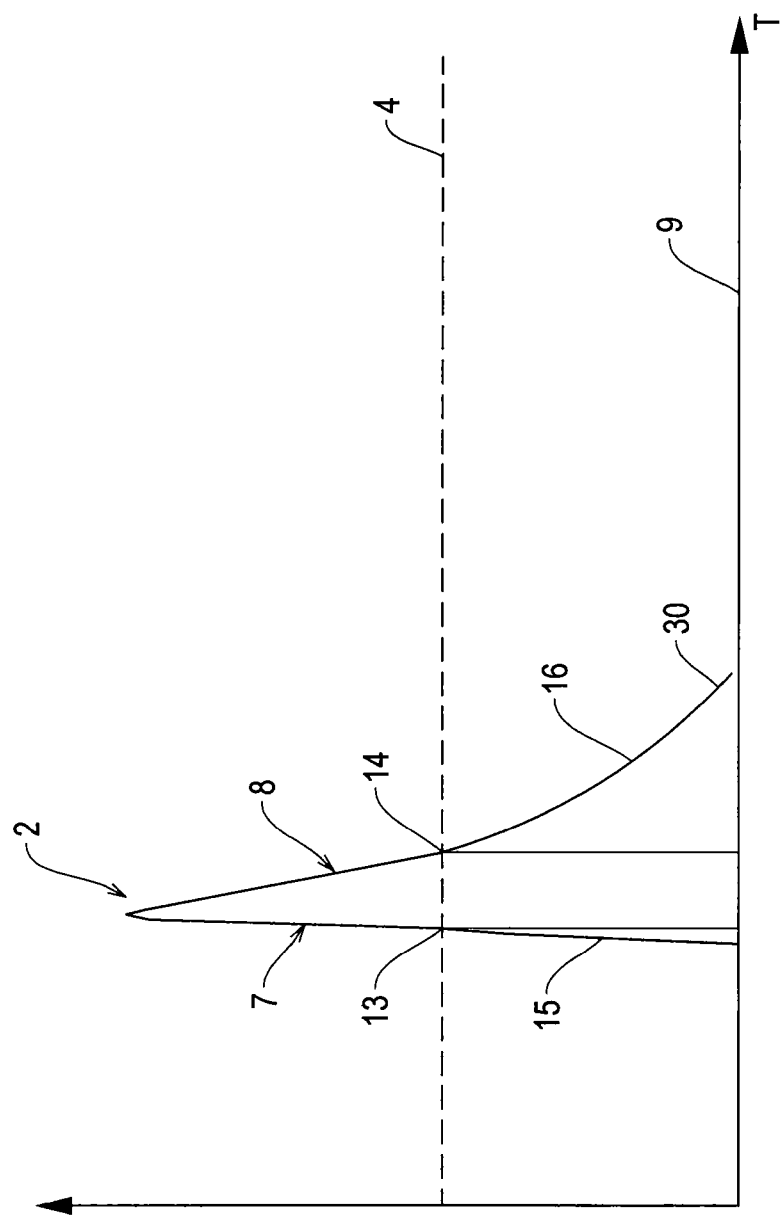
FIG. 3 illustrates a compensated data stream compiled using a method embodying the present invention.

FIG. 3 illustrates a compensated data stream 30 in which the filtered data stream 20 or FIG. 2 has been extrapolated using a method embodying the present invention

Leading Edge Extrapolation

Referring to FIG. 1, only the segment 10 of the data peak 2 above the predetermined threshold 4 is stored for subsequent operation—i.e. to produce the filtered data stream 20 of FIG. 2. A method embodying the present invention uses the rate of increase of the amplitude of the leading edge 7 of the peak 2 when above the threshold 4 to estimate the amplitude of the leading edge 7 when below the threshold 4.

It will be appreciated that this method involves extrapolating backwards. Therefore, the estimated amplitude of the input data stream 1 when below the predetermined threshold 4 can only be calculated after the amplitude of the input data stream 1 has risen above the predetermined threshold 4.

A method of extrapolating the leading edge 7 of a data peak 2 embodying the present invention comprises identifying the leading edge crossover point 13 of a data peak 2. The leading edge crossover point 13 is identified when the amplitude of the data peak 2 increases from below the predetermined threshold 4 to above the predetermined threshold 4. The time at which the leading edge crossover point 13 occurs is referred to herein as $T_L$ (see FIG. 2).

A method embodying the present invention subsequently estimates the amplitude of the data peak 2 at a previous time interval, $T_{L-1}$, by applying a growth function to the measured amplitude of the data peak 2 at time $T_L$. The growth function is based on a shape characteristic of the peak. The amplitude of the leading edge 7 at time $T_{L-1}$ will be lower than the amplitude of time $T_L$.

The growth function may be predetermined, based on the anticipated shape characteristic of the peak. In one embodiment, a shape characteristic may be determined for each peak being measured.

For example, the shape characteristic may be determined or estimated by assessing the amplitude of the leading edge 7 at two or more sample times when above or equal to the predetermined threshold 4. The rate of change of the amplitude between the two sample times may be used to estimate the rate of linear increase of the amplitude of the leading edge 7. This is the growth function.

The method iteratively applies the growth function to the estimated amplitude of the peak at a given time $T_n$, to produce an estimated amplitude of the peak at time $T_{n-1}$. Thus, the amplitude of the leading edge 7 at time $T_{L-2}$ will be estimated by applying the growth function to the estimated amplitude of the leading edge at time $T_{L-1}$ A method embodying the present invention continues to extrapolate the leading edge 7 backwards until the estimated amplitude is less than or substantially equal to the mean 9 of the baseline (or zero); or when the amplitude of the input data stream 1 at time T is equal to or greater than the predetermined threshold 4 (due to, for example, the data stream including the trailing edge 8 of another peak 2 immediately before the leading edge 7 being extrapolated).

FIG. 3 illustrates a segment 15 of estimated amplitude for the leading edge 7 of the data peak 2 when below the predetermined threshold, estimated according to a method embodying the present invention. It will be noted that the segment 15 has been extrapolated back to the mean 9 of the baseline, since the input data stream 2 remained below the threshold 4 during the time period of the extrapolated segment 15.

Although the growth function in the example described above is linear, the method may adopt any growth function. For example, the leading edge 7 may be determined or estimated to increase substantially exponentially, in which case an exponential growth function may be adopted to extrapolate the leading edge 7.

Trailing Edge Extrapolation

Extrapolating the trailing edge 8 of the data peak 2 is similar to extrapolating the leading edge 7, in so far as the amplitude (either measured or estimated) at one time interval is used to estimate the amplitude at an adjacent time interval.

A method of extrapolating the trailing edge 8 of a data peak 2 embodying the present invention comprises identifying the trailing edge crossover point 14 of a data peak 2. The trailing edge crossover point 14 is identified when the amplitude of the data peak 2 decreases from above the predetermined threshold 4 to below the predetermined threshold 4. The time at which the trailing edge crossover point 14 occurs is referred to herein as $T_T$ (see FIG. 2).

A method embodying the present invention estimates the amplitude of the data peak 2 at a subsequent time interval, $T_{T+1}$, by applying a decay function to the amplitude of the data peak 2 at time $T_T$. The decay function is based on the shape characteristic of a peak 2.

To estimate the amplitude of the peak at a time $T_n$, the method iteratively applies the decay function to the estimated amplitude of the peak 2 at a previous time interval $T_{n-1}$.

A method embodying the present invention continues to extrapolate the trailing edge 8 forwards until the estimated amplitude at a time $T_n$ is substantially equal to the mean 9 of the baseline (or zero); or the measured amplitude of the input data stream at a time $T_n$ is greater than or equal to the predetermined threshold 4 (due to, for example, the data stream 1 including the leading edge 7 of another peak 2 immediately after the trailing edge 8 of the peak being extrapolated).

Preferably, the decay function used to extrapolate the trailing edge 8 is a constant. The step of applying the decay function comprises multiplying the amplitude of the peak at a time $T_{n-1}$ by a constant decay value between 0 and 1, to estimate the amplitude at time $T_n$.

FIG. 3 illustrates a segment 16 of estimated amplitude for the trailing edge 8 of the data peak 2 when below the predetermined threshold, estimated according to a method embodying the present invention. It will be noted that the segment 15 has been extrapolated back to the mean 9 of the baseline, since the input data stream 1 remained below the threshold 4 during the time period of the extrapolated segment 16.

Although the decay function in the example described above is exponential, the method may adopt any decay function. For example, the trailing edge 8 may be determined or estimated to decrease substantially linearly, in which case a linear decay function may be adopted to extrapolate the trailing edge 8.

Compensated Data Stream

The compensated data stream 30 illustrated in FIG. 3 comprises the filtered data stream 20 of FIG. 2, the segment 15 of estimated amplitude of the leading edge 7, and the segment 16 of estimated amplitude of the trailing edge 8.

The compensated data stream 30 of FIG. 3 more closely correlates to the input data stream of FIG. 1 but without the noise 3 and any spontaneous detector events 12. The mean 9 of the baseline has also been subtracted. As a result, centroid detection and calculation of the area of the peak 2 of the compensated data stream 30 will be more accurate than the conventional thresholding method in isolation.

Multiple Ion Events

A method embodying the present invention is particularly advantageous when used to process an input data stream comprising at least partially overlapping ion events. That is to say where the trailing edge 8 of one peak 2 at least partially overlaps with the leading edge 7 of another peak.

Figure 4:
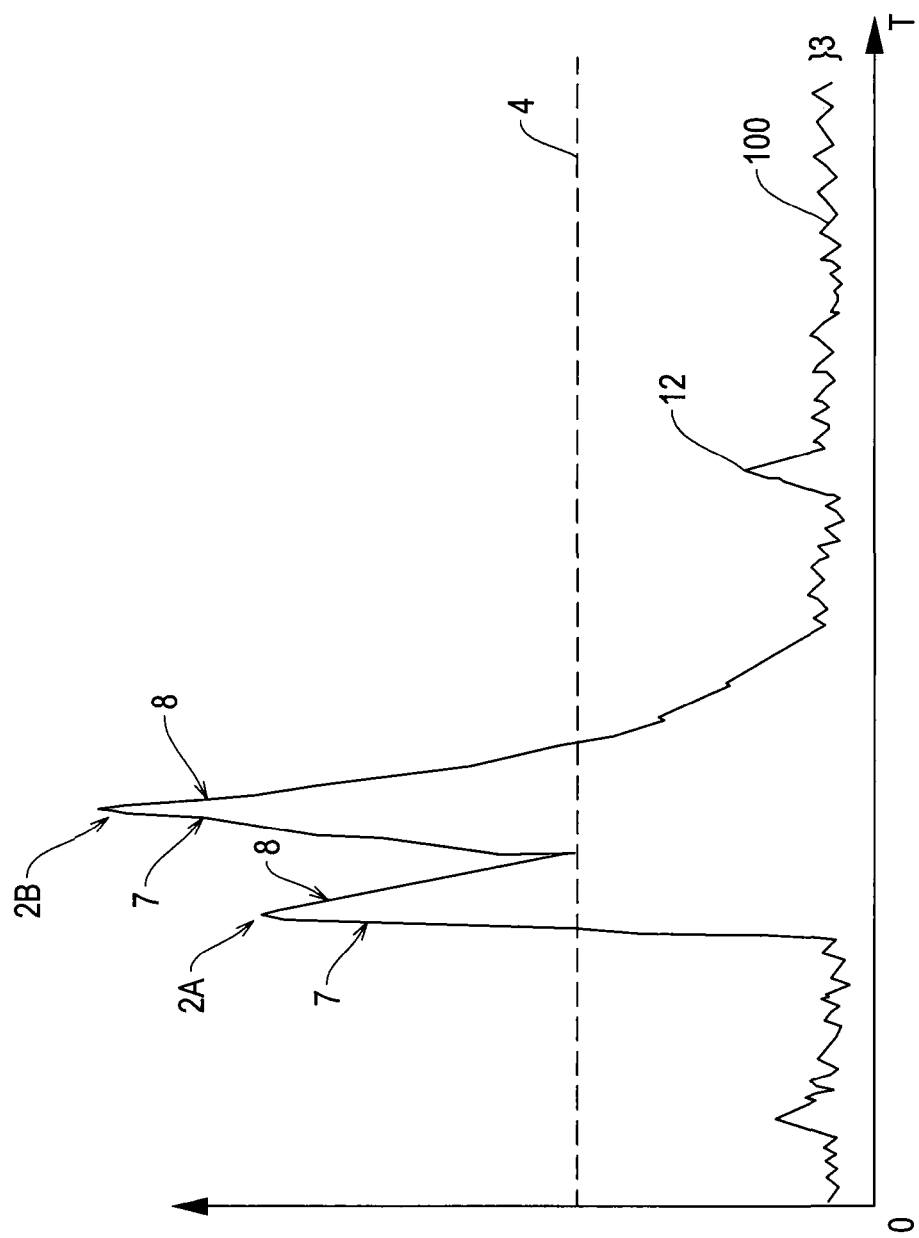
FIGS. 4 and 5 illustrate an input data stream depicting two overlapping ion responses.

FIG. 4 illustrates a data stream 100 depicting two peaks 2A, 2B. The first data peak 2A is of identical intensity and shape to the data peak 2 shown in FIG. 1.

In isolation, the intensity and shape of the second peak 2B is also identical to that of the first peak 2A. However, since the leading edge 7 of the second peak 2B overlaps with the trailing edge 8 of the first peak 2A, the respective amplitudes of both peaks 2A, 2B during the overlap are compounded in the input data stream 100. As a result, more of the second data peak 2B is above the predetermined threshold 4 than the first data peak 2A. As described above, this leads to inaccuracies when a conventional thresholding method is used.

Figure 5:
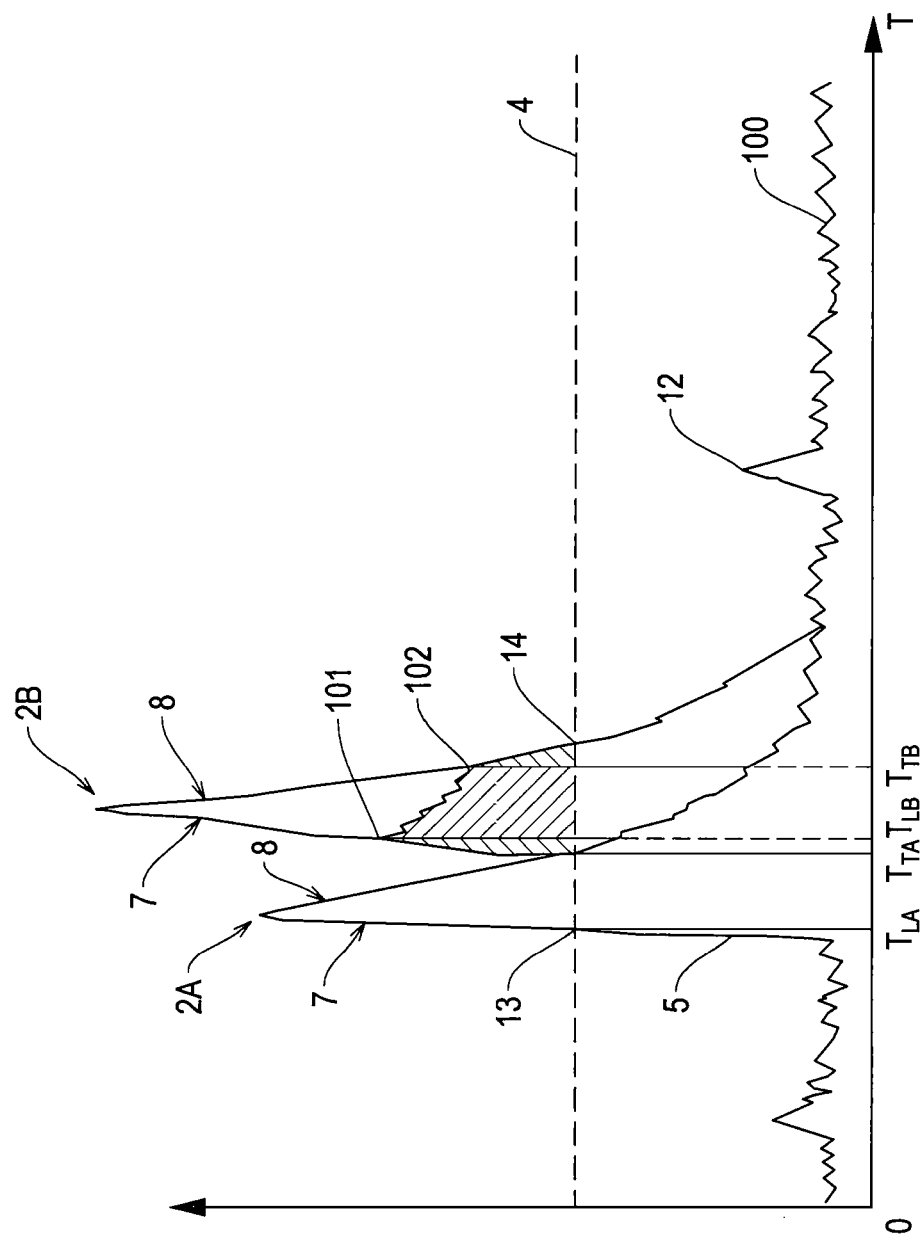

FIG. 5 schematically illustrates how the first and second peak 2A, 2B data are compounded together to produce the input data stream 100 shown in FIG. 4. As with FIG. 1, a segment 5 of the leading edge 7 of the data peak 2A is below the predetermined threshold. However, the trailing edge 8 of the first peak 2A does not fall below the predetermined threshold 4 because it is compounded with the leading edge 7 of the second data peak 2B, and is thus 'pushed' above the threshold 4.

Point 101 denotes the point of the leading edge 7 of the second peak 2B which would have been the leading edge crossover point if the second peak 2B was separate from the first peak 2A. However, since part of the leading edge 7 of the second peak 2B is compounded with the segment 6 of the trailing edge 8 of the first peak 2A, the amplitude of the input data stream 100 is caused to increase above the predetermined threshold 4. The start of the leading edge 7 of the second peak 2B coincides with the point at which the amplitude of the trailing edge 8 of the first peak 2A equals the predetermined threshold 4. As a result, all of the segment 5 of the second data peak 2B will be above the predetermined threshold 4. The shaded area beneath point 101 in FIG. 5 denotes the amount of the second data peak 2B which has been caused to exceed the predetermined threshold by it being compounded with the trailing edge 8 of the first peak 2A.

Applying a predetermined threshold to the data stream of FIGS. 4 and 5, without the extrapolation of the present invention, would mean that the segment 5 of the leading edge 7 of the first data peak and the segment 6 of the trailing edge 8 of the second data peak 2B would be removed from the filtered data stream, but the corresponding segment 5 of the leading edge 7 second data peak and the corresponding segment 6 of the trailing edge 8 of the first data peak 2A would still be included. This causes inaccuracies.

Point 102 denotes the point of the trailing edge 8 of the second peak 2B which would have been the trailing edge crossover point if the second peak 2B was separate from the first peak 2A. However, since part of the trailing edge 8 of the second peak 2B is compounded with the trailing edge 8 of the first peak 2A, the amplitude of the input data stream 100 is caused to increase above the predetermined threshold 4.

Accordingly, the area of the data recorded in respect of the second peak 2B will be larger than that for the first peak 2A. This is despite the fact that, if the first 2A and the second 2B peaks were separated in time, the area of the part 10 of the peak 2A, 2B above the predetermined threshold 4 would be identical.

When the data peaks 2A, 2B are overlapping, this leads to a non-linear relationship between actual ion current and reported ion current. For time of flight (TOF) instruments, this would also lead to m/z shift depending on the amount of the data stream which is above the threshold.

By adopting a method embodying the present invention, the leading edge 7 of the first peak 2A and the trailing edge 8 of the second peak 2B are extrapolated. The trailing edge 8 of the first peak 2A and the leading edge 8 of the second peak 2B are not extrapolated since they are compounded so as to be above the predetermined threshold. Only when the input data stream 100 is below the threshold is extrapolation performed.

Figure 6:
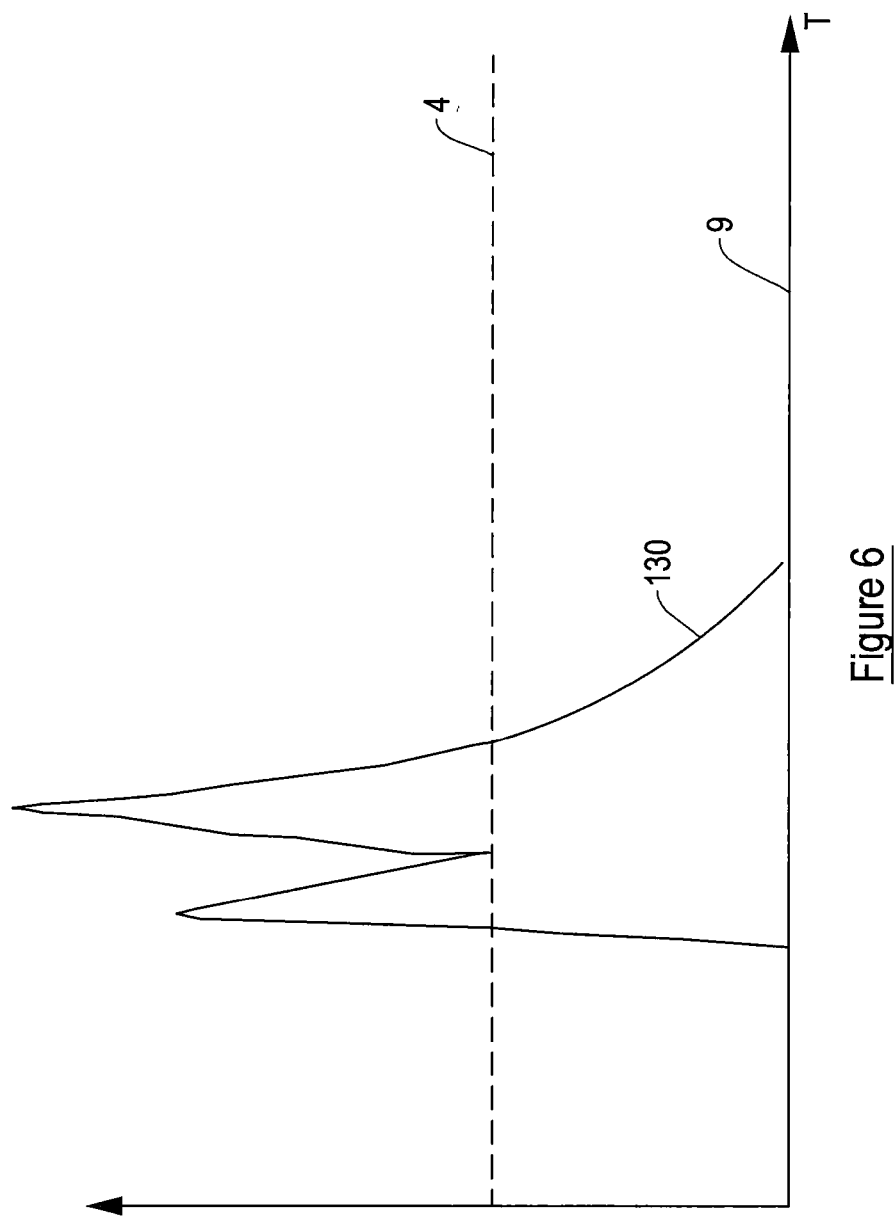
FIG. 6 illustrates a compensated data stream compiled using a method embodying the present invention.

FIG. 6 illustrates the resultant compounded data stream 130, compiled by processing the input data stream 100 of FIG. 4 using a method embodying the present invention.

Figure 7:
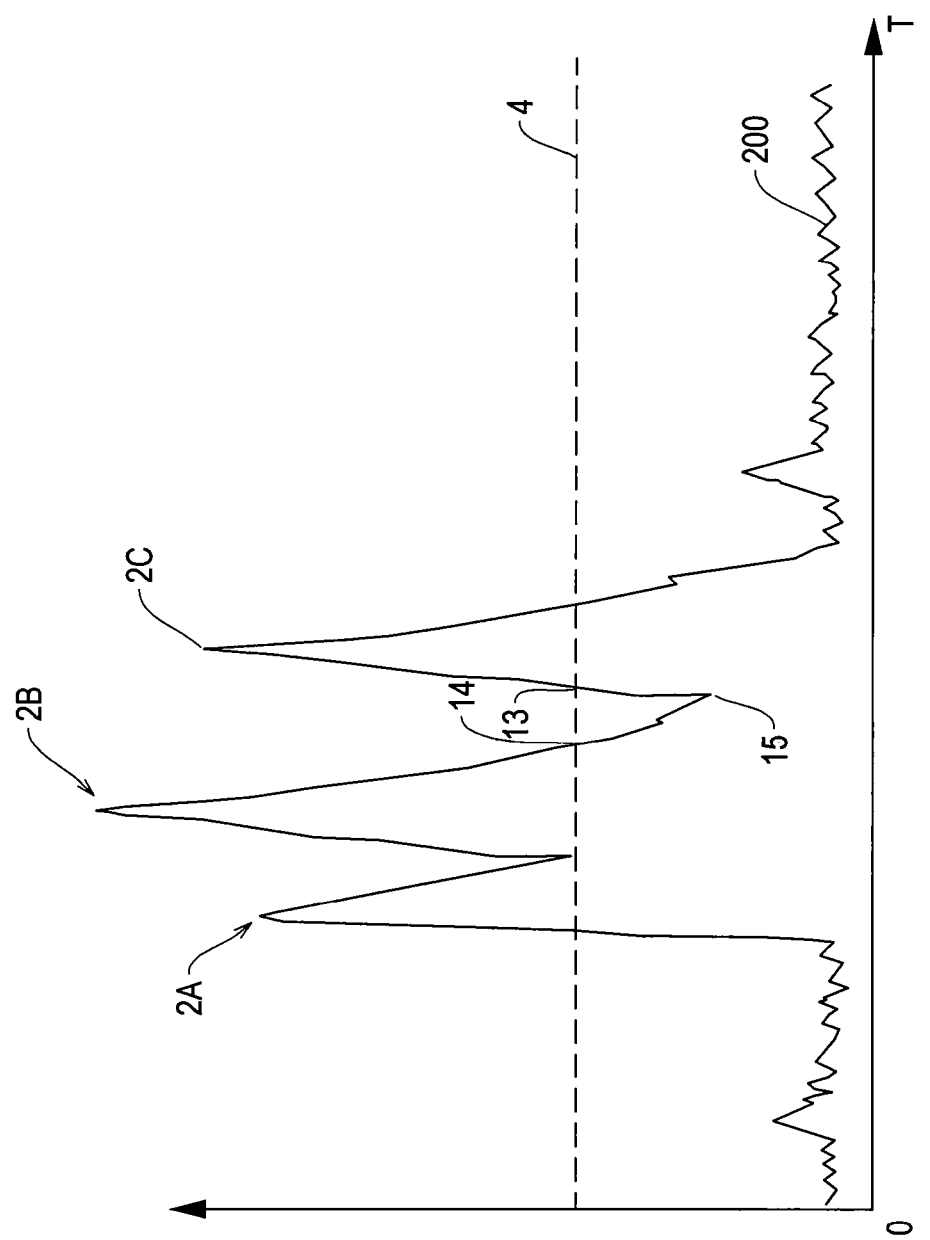
FIG. 7 illustrates a data stream depicting three overlapping ion responses.

FIG. 7 illustrates an input data stream 200 comprising three data peaks, 2A, 2B and 2C. The size and shape of the first and second peaks in isolation are identical to those shown in FIGS. 4 and 5. The size and shape of the third peak 2C, in isolation, is also identical to that of the first 2A and second 2B peaks.

It will be noted that the trailing edge 8 of the second peak 2B falls below the predetermined threshold 4, and that the beginning of the leading edge 7 of the third peak 3B is also below the predetermined threshold 4. At point 15, the leading edge 7 of the third peak 3C compounds with the end of the trailing edge 8 of the second peak to cause the input data stream 200 to rise toward the predetermined threshold 4.

The amplitude of the data stream 200 between the trailing edge crossover point 14 of the second peak 2B and the leading edge crossover point 13 of the third peak 2C will be set to zero (or ignored or flagged) in the filtered data stream (not shown). Consequently, the method embodying the present invention will then extrapolate the second peak 2B, forwards, from the trailing edge crossover point 14B. According to one embodiment, the extrapolation of the trailing edge will iteratively continue until the amplitude of the input data stream 200 is greater than or equal to the predetermined threshold 4, or the estimated amplitude at that time is substantially equal to the mean 9 of the baseline.

Figure 8:
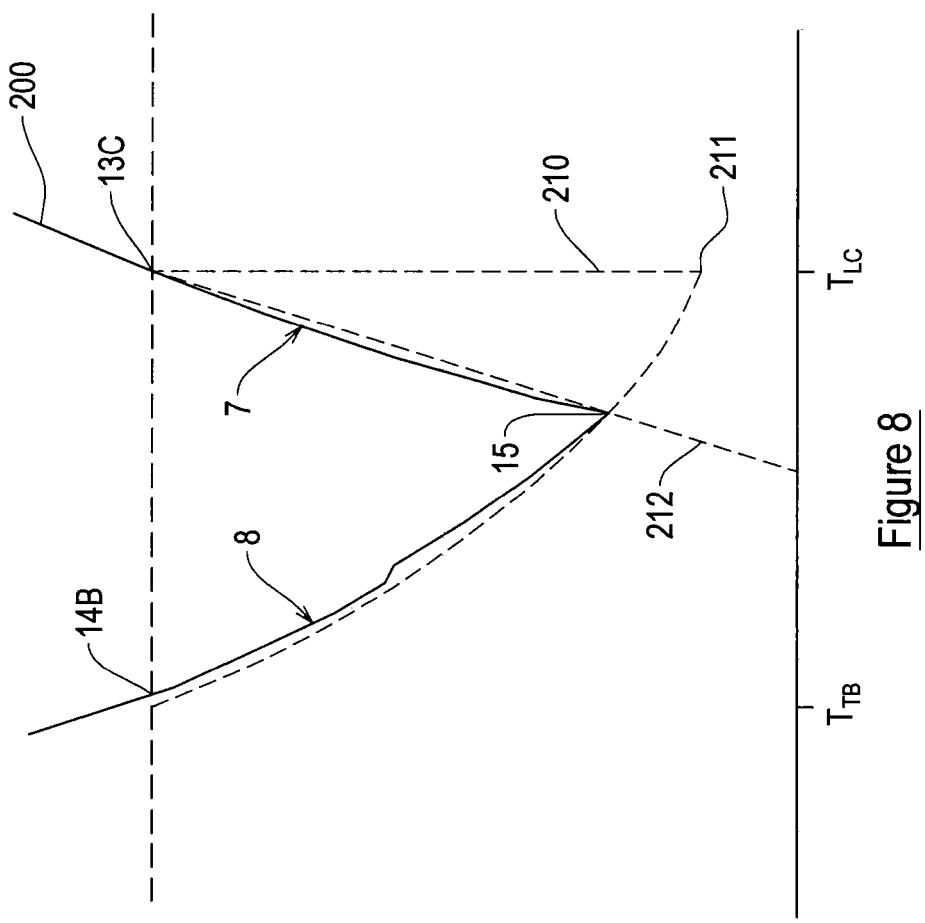
FIG. 8 illustrates part of the data stream of FIG. 7.

FIG. 8 shows an enlarged portion of the data stream 200 of FIG. 7 between the trailing edge crossover point 14B of the second peak 2B and the trailing edge crossover point 13C of the third peak 2C.

When the data stream 200 crosses the trailing edge crossover point 14B, of the second peak 2B, a method embodying the present invention will then extrapolate the peak 2B using a decay function, the result of which is indicated with the decreasing portion of dotted line 210 in FIG. 8. According to a method embodying the present invention, the extrapolation will continue until a point 211 when the amplitude of the input data stream 200 exceeds the predetermined threshold 4.

However, with reference to FIG. 8, it will be noted that the extrapolated data stream 210 does not accurately estimate the leading edge 7 of the third peak 2C.

According to an embodiment of the present invention, the leading edge 7 of the third peak 2C will also be extrapolated backwards.

With reference to FIG. 8, dotted line 212 denotes the estimated amplitude by extrapolating the leading edge 7C of the third peak 13C.

At all times between $T_{TB}$ and time $T_{LC}$, the highest estimated amplitude will be used. As a result, the estimated amplitude of the portion of the input data stream 200 illustrated in FIG. 8 will more closely follow the "V shaped" nature of the input data stream 200.

Accordingly, at any time T, if there are conflicting estimates of the amplitude, based on the extrapolation of multiple peaks in the input data stream, the highest estimated amplitude at that time T will be used.

Figure 9:
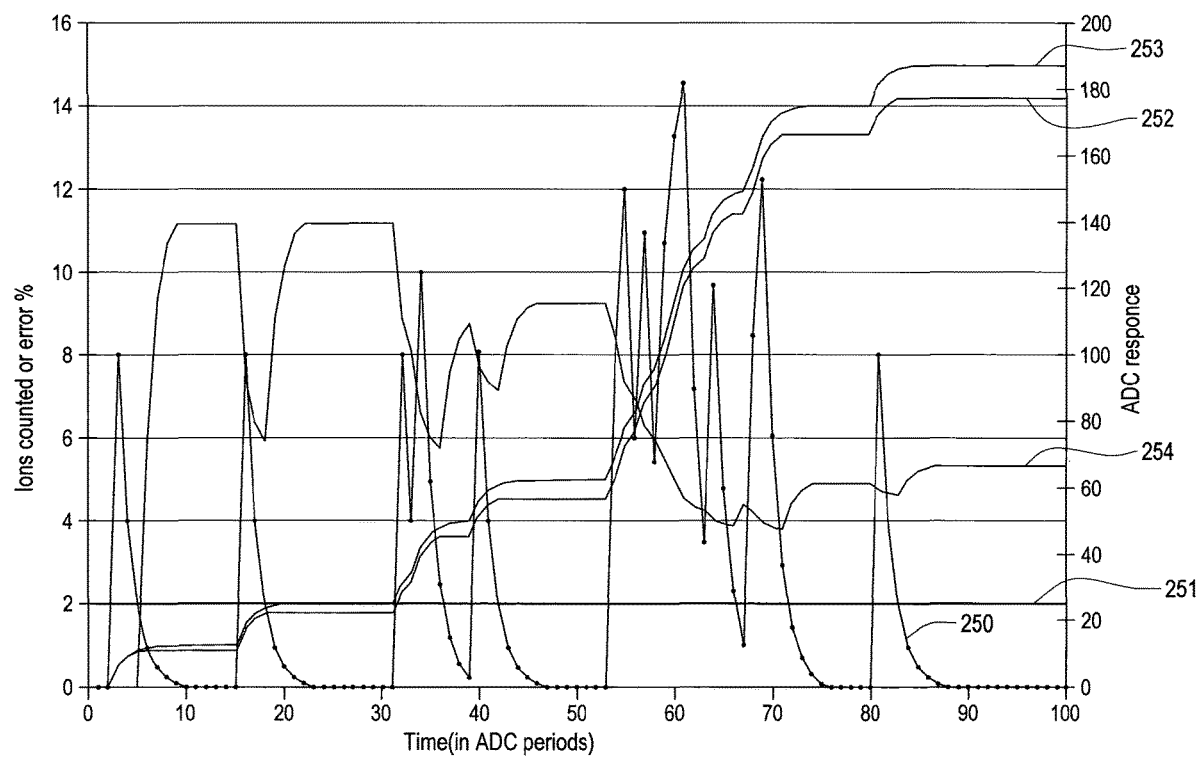
FIG. 9 illustrates a further data stream.

FIG. 9 illustrates a further input data stream, comprising multiple data peaks, some of which are separated in time and some of which are overlapping.

Line 250 denotes the input data stream. Line 251 denotes the threshold. Line 252 is the sum of the input data stream using conventional thresholding. Line 253 denotes the sum of the input data stream when compensated using a method embodying the present invention. Line 254 denotes the percentage difference (error) between the sum of the input data stream using conventional thresholding and the 'ideal' of the sum of the input data steam. The threshold is 25 and the decay function is 0.5.

It will be noted that the sum 252 of the input data stream using conventional thresholding is inevitably lower than the sum 253 of the compensated data stream generated according to a method embodying the present invention. This is because the compensated data stream includes data from extrapolating the parts of the input data steam which are under the threshold; whereas the traditional thresholding technique ignores the part of the input data stream under the threshold.

As a consequence, the error between applying a conventional thresholding technique to the data stream and a method embodying the present invention is greatest when the input data stream is below the predetermined threshold.

In embodiments of the present invention, both a filtered data stream and a data stream comprising the extrapolated peak data are generated first, and then compiled to create a compensated data stream. Subsequently, the compensated data stream is summed over time.

Alternatively, rather than first compiling a discrete data stream based on a particular operation and then summing the values over time, the input data stream can instead be summed substantially in real time. Accordingly, in one embodiment, the present invention comprises summing the input data stream when above the predetermined threshold and summing the extrapolated peak when the input data stream is below the predetermined threshold.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A mass spectrometer comprising:
   an ion source;
   an analyser;
   an ion detector producing a data stream; and
   a processor configured or programmed to:
   detect at least one peak in the data stream having an apex with an amplitude above a predetermined threshold; and
   extrapolate the segment of the peak which has an amplitude above the predetermined threshold, based on a shaped characteristic of the peak, to estimate the amplitude of the segments of the peak which have an amplitude less than said threshold;

produce a filtered data stream, comprising applying a predetermined threshold to the input data stream, such that the filtered data stream contains only the segment of the peak above the predetermined threshold; and compile a compensated data stream including the filtered data and extrapolated peak data.

2. A mass spectrometer according to claim 1, wherein the detecting at least one peak comprises detecting at least one of the leading edge, apex or trailing edge of the peak.

3. A mass spectrometer according to claim 1, wherein the processor is configured or programmed to produce a filtered data stream, comprising applying a predetermined threshold to the input data stream, such that the filtered data stream contains only the segment of the peak above the predetermined threshold.

4. A mass spectrometer according to claim 1, wherein if the amplitude of the input data stream at a time $T_n$ is less than said threshold, the amplitude in the filtered data stream at time $T_n$ is set to one of zero or a constant.

5. A mass spectrometer according to claim 3, wherein the processor is configured or programmed to:

compile a compensated data stream including the filtered data stream and extrapolated peak data.

6. A mass spectrometer according to claim 1, wherein the processor is configured or programmed to: sum the estimated amplitude of extrapolated peak data and the filtered data stream over time.

7. A mass spectrometer according to claim 1, wherein the processor is configured or programmed to estimate a shape characteristic of the peak.

8. A mass spectrometer according to claim 1, wherein the extrapolating comprises:

detecting the time, $T_T$, at which the amplitude of the trailing edge of the peak in the input data stream falls below the predetermined threshold; and estimating the amplitude of the peak at time $T_T$ by applying a decay function, based on the shape characteristic, to the amplitude of the data peak at time $T_{T-1}$, above the predetermined threshold.

9. A mass spectrometer according to claim 8, wherein the extrapolating further comprises:

estimating the amplitude of the peak at time $T_n$ by applying the decay function, based on the shape characteristic of the peak, to the estimated amplitude of the peak at time $T_{n-1}$; and iteratively applying the decay function for all values of n until the amplitude of the input data stream at time $T_n$ is greater than or equal to the predetermined threshold, or the estimated amplitude at time $T_n$ is substantially equal to zero, a mean of the baseline, or a constant.

10. A mass spectrometer according to claim 8, wherein the applying the decay function comprises multiplying the amplitude of the peak at time $T_{n-1}$ by a constant decay value between 0 and 1.

11. A mass spectrometer according to claim 1, wherein the extrapolating comprises:

detecting the time, $T_L$, at which the amplitude of the leading edge of the peak in the input data stream increases above the predetermined threshold; and applying a growth function, based on the shape characteristic, to the amplitude of the data peak at time $T_L$, to produce an estimated amplitude of the peak at time $T_{L-1}$.

12. A mass spectrometer according to claim 11, wherein the extrapolating further comprises:

estimating the amplitude of the peak at time $T_{n-1}$ by applying a growth function, based on the shape characteristic of the peak, to the estimated amplitude of the peak at time $T_n$; and iteratively applying the growth function for all values of n until the amplitude of the input data stream at time $T_{n-1}$ is greater than or equal to the predetermined threshold; or the estimated amplitude at time $T_{n-1}$ is less than or substantially equal to zero, a mean of the baseline, or a constant.

13. A mass spectrometer according to claim 11, wherein the growth function is linear.

14. A mass spectrometer according to claim 11, in which the amplitude at time $T_{n-1}$ is estimated by subtracting a predetermined constant from the estimated amplitude at time $T_n$.

15. A mass spectrometer according to claim 11, wherein the growth function is based on the rate of change of at least part of the segment of the input data stream which is above the predetermined threshold.

16. A mass spectrometer according to claim 1, wherein if the input data stream includes two or more peaks, and extrapolation of the respective peaks generates conflicting estimates for the amplitude at a time T, the highest of those estimates is selected for time T.

17. A mass spectrometer according to claim 1, in which the input data stream comprises a signal output from an ion detector, a voltage signal, ion signal, ion current voltage pulse or an electron current pulse, or the output of an analogue to digital converter of an ion detector of a mass spectrometer.

18. A mass spectrometer according to claim 17, wherein the processor is configured or programmed to apply a smoothing function to the input data stream using a finite impulse response or infinite impulse response filter.

* * * * *